US011952975B2

(12) United States Patent
Christensen

(10) Patent No.: US 11,952,975 B2
(45) Date of Patent: Apr. 9, 2024

(54) WAVE ENERGY PLANT

(71) Applicant: Henrik Frans Christensen, Sjællands Odde (DK)

(72) Inventor: Henrik Frans Christensen, Sjællands Odde (DK)

(73) Assignee: Henrik Frans Christensen, Sjællands Odde (DK)

( * ) Notice: Subject to any disclaimer, the term of this patent is extended or adjusted under 35 U.S.C. 154(b) by 0 days.

(21) Appl. No.: 18/000,854

(22) PCT Filed: Feb. 8, 2022

(86) PCT No.: PCT/DK2022/050020
§ 371 (c)(1),
(2) Date: Dec. 6, 2022

(87) PCT Pub. No.: WO2022/179670
PCT Pub. Date: Sep. 1, 2022

(65) Prior Publication Data
US 2023/0228242 A1 Jul. 20, 2023

(30) Foreign Application Priority Data

Feb. 25, 2021 (DK) .......................... PA 2021 70088

(51) Int. Cl.
*F03B 13/22* (2006.01)
*F03B 13/18* (2006.01)

(52) U.S. Cl.
CPC .......... *F03B 13/22* (2013.01); *F03B 13/1805* (2013.01); *F03B 13/181* (2013.01); *F03B 13/1815* (2013.01)

(58) Field of Classification Search
CPC ...................... F03B 13/12; F03B 13/14; F03B 13/1805–182; F03B 13/187; F03B 13/22
(Continued)

(56) References Cited

U.S. PATENT DOCUMENTS 1,667,152 A 4/1928 Martin
3,970,415 A 7/1976 Widecrantz et al.
(Continued)

FOREIGN PATENT DOCUMENTS

CN 103925142 A 7/2014
CN 212337524 U 1/2021
(Continued)

OTHER PUBLICATIONS

International Search Report and Written Opinion dated May 16, 2022, in connection with International Patent Application No. PCT/DK2022/050020, 10 pgs.
(Continued)

*Primary Examiner* — Mickey H France
(74) *Attorney, Agent, or Firm* — Chiesa Shahinian & Giantomasi PC

(57) ABSTRACT

The invention relates to a system that includes a wave energy converter and an assembly, adapted to be driven by the wave energy converter. The wave energy converter includes an array, in the form of rows and columns, of floating elements adapted to float on a sea surface in the vicinity of a shore. Each floating element has a first and a second end, each end being connected to a lever, the lever being connected through a bearing to a pivot point. Each lever is connected in an articulated manner to a piston rod in a wave-actuated liquid pump, that is in fluid communication with the pipe, adapted to lead a liquid to a workstation, wherein the workstation includes the assembly.

21 Claims, 9 Drawing Sheets

(58) Field of Classification Search
USPC .............. 290/42, 53; 60/495–501, 506, 507; 417/100, 330–332
See application file for complete search history.

(56) References Cited

U.S. PATENT DOCUMENTS

| | | |
|---|---|---|
| 4,013,382 A | 3/1977 | Diggs |
| 4,125,346 A | 11/1978 | Pickle |
| 5,549,445 A | 8/1996 | Schremp |
| 2003/0145587 A1 | 8/2003 | Christensen |
| 2010/0038913 A1* | 2/2010 | Svelund .................. F03B 13/20 |
| | | 700/287 |
| 2011/0316280 A1 | 12/2011 | Khesali |
| 2015/0219066 A1 | 8/2015 | Solheim |
| 2017/0101977 A1 | 4/2017 | Sidenmark |
| 2020/0362821 A1 | 11/2020 | Shi et al. |

FOREIGN PATENT DOCUMENTS

| | | | |
|---|---|---|---|
| GB | 1587593 A | 4/1981 | |
| WO | 2005038246 A1 | 4/2005 | |
| WO | 2007/030841 A1 | 3/2007 | |
| WO | 2009/093988 A2 | 7/2009 | |

OTHER PUBLICATIONS

International Preliminary Report on Patentability (Chapter II of the Patent Cooperation Treaty) dated Aug. 30, 2022, In connection with International Patent Application No. PCT/DK2022/050020, 6 pgs.

* cited by examiner

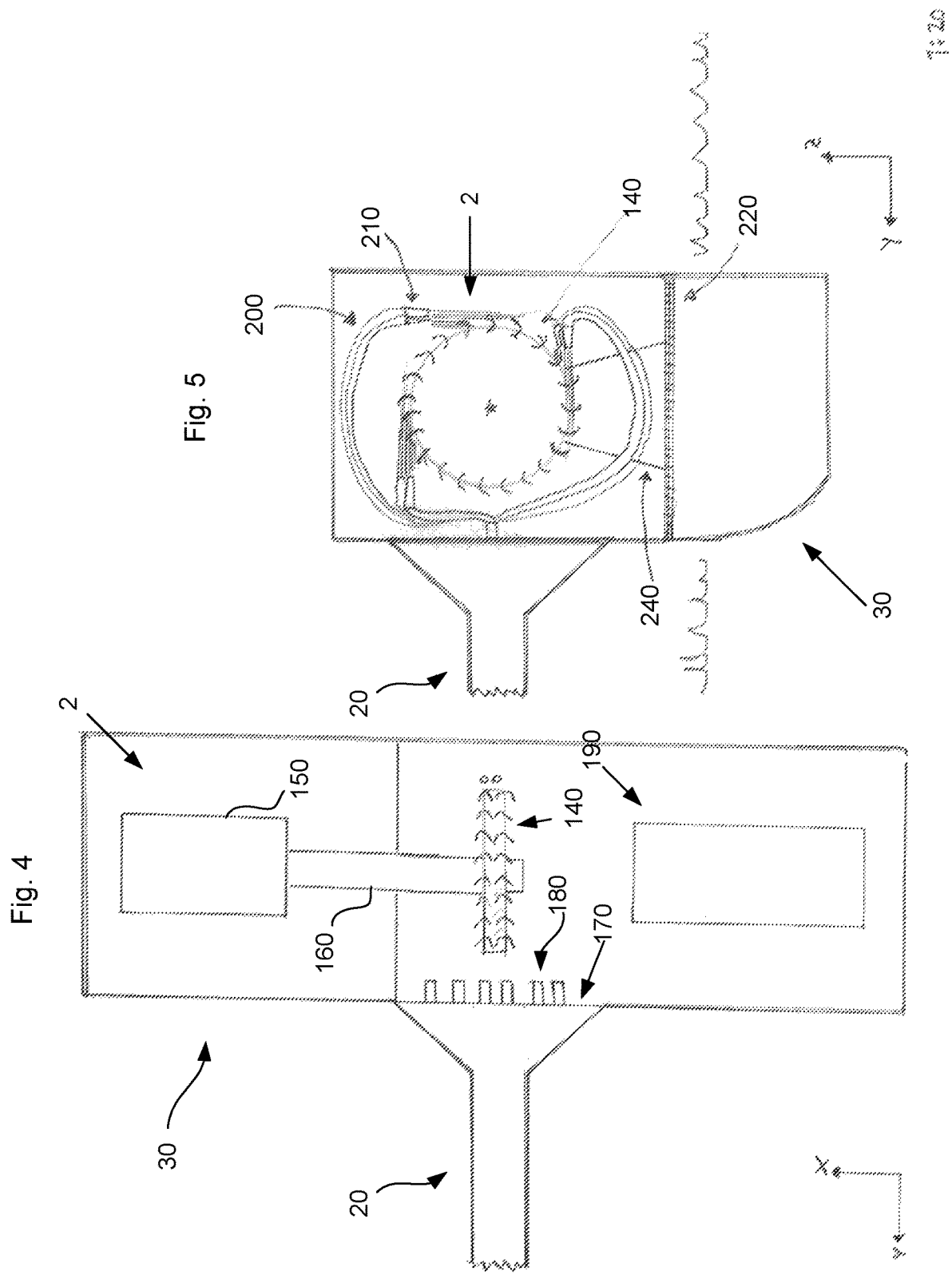

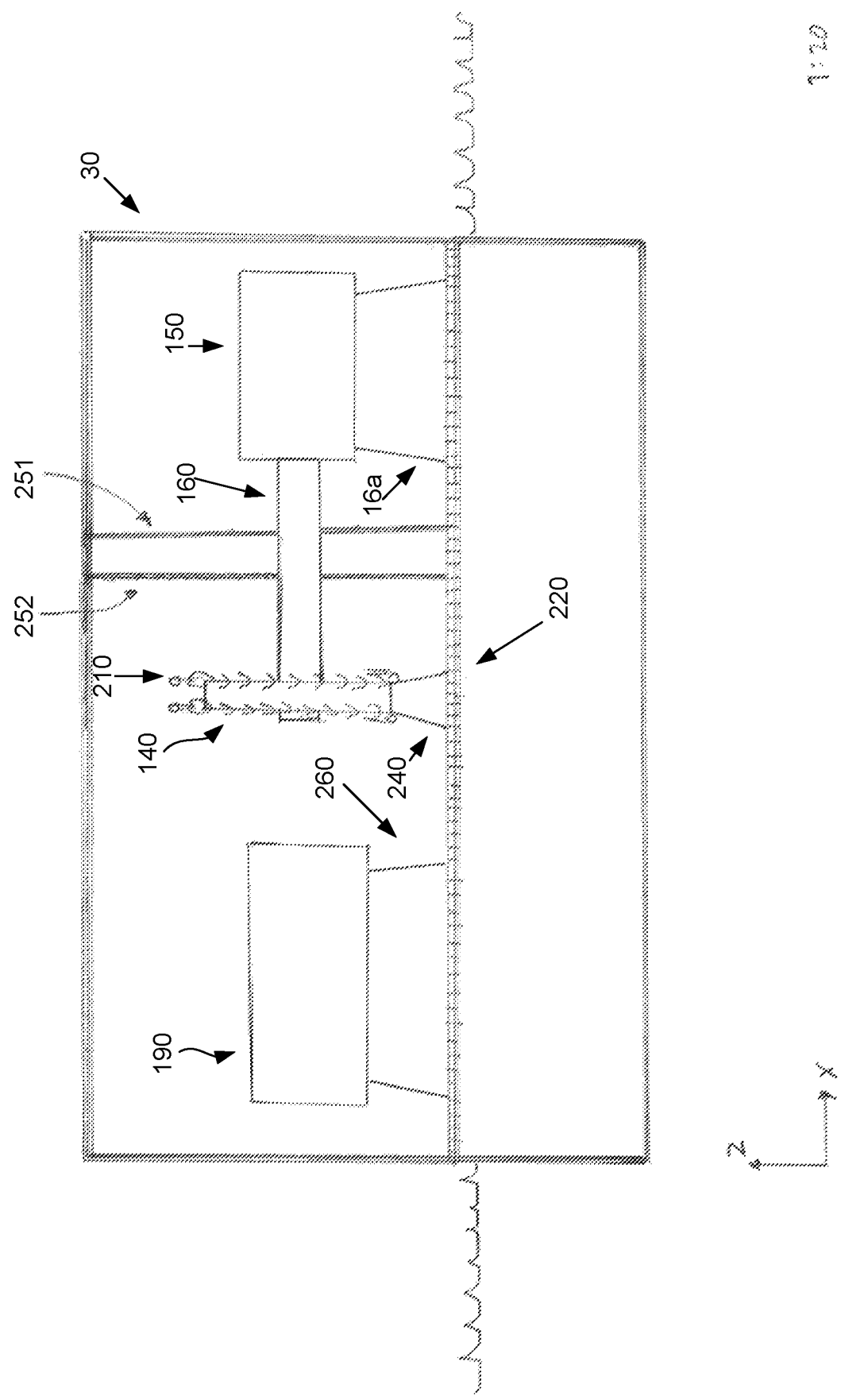

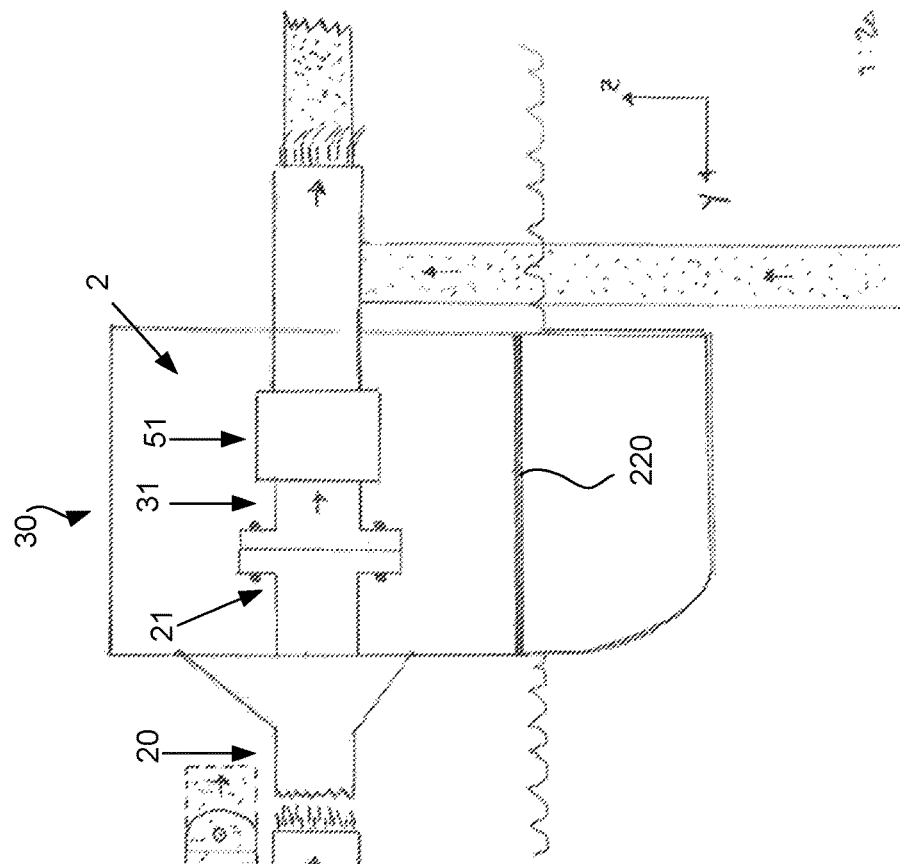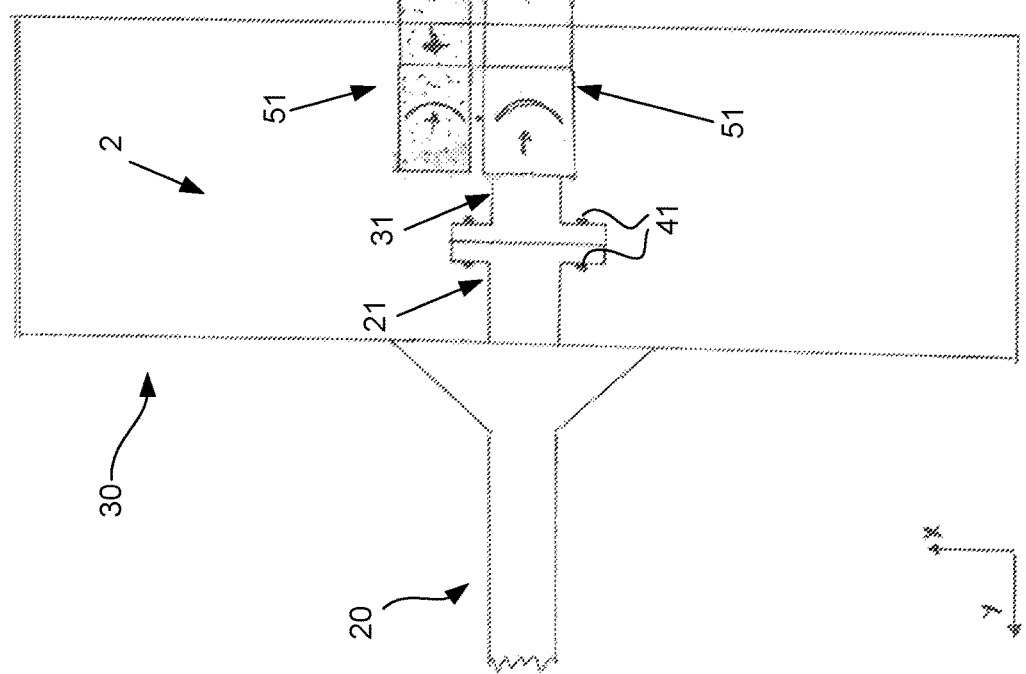

ial Patent Application No. PCT/DK2022/ 050020, filed Feb. 8, 2022, which claims priority from Danish Patent Application No. PA 2021 70088, filed Feb. 25, 2021; the disclosure of all of which are incorporated herein by reference in their entirety.

WAVE ENERGY PLANT

CROSS-REFERENCE TO RELATED APPLICATIONS

This application is a National Stage under 35 U.S.C. 371 of International Patent Application No. PCT/DK2022/050020, filed Feb. 8, 2022, which claims priority from Danish Patent Application No. PA 2021 70088, filed Feb. 25, 2021; the disclosure of all of which are incorporated herein by reference in their entirety.

FIELD OF INVENTION

The present invention relates to a system comprising a wave energy converter.

BACKGROUND OF THE INVENTION

The development and utilization of renewable wave energy provides a promising solution to meet today's high energy demand and contribute to the fossil fuel phase-out.

In plants for extraction of energy from waves, the final price of the energy produced depends partly on the construction costs and partly on the overall efficiency. The known plants are generally rather complex and therefore expensive to construct, and moreover the efficiencies achieved are not optimum.

In the case of wave energy, some types of installations are based on having a large number of plants spread across the sea, which means that optimal placement of these in order to achieve optimal wave energy capture also affects the overall plant efficiency. Another factor that applies to wave energy plants, unlike, for example, a commercial offshore wind turbine, which also collects energy by the sea, is that the most efficient, and most used wind turbine type today worldwide is a 3-blade horizontal axle Wind Turbine. However, when it comes to wave energy, the solutions are going in different directions and a winning concept has not yet been developed for commercial wave energy plants.

A floating wind-wave energy integrated system utilizing a tension leg platform supporting structure in the ocean is presented in US 2020/0362821, Another device for wave energy absorption is disclosed in US2017/0101977, where the device comprises a hydraulic pump, a buoy adapted to move with movements of water and a buoy oscillation device. These systems provide complicated and expensive solutions for wave energy utilization, wherein the achieved robustness of the system is important.

However, there arises a need to implement a wave energy plant which is efficient at absorbing wave energy, while also being simple in design and operation and cost effective to manufacture.

SUMMARY OF THE INVENTION

The object of the present invention is to provide an efficient and scalable wave energy plant of a simpler design, which yields a higher output than prior-art plants.

In view of this object, according to a first aspect of the invention, a system is disclosed, comprising a wave energy converter and an assembly, adapted to be driven by the wave energy converter, the wave energy converter comprises an array, preferably in the form of rows and columns, of floating elements adapted to float on a sea surface in the vicinity of a shore, each floating element having a first and a second end, each end being connected to a lever, the lever being connected through a bearing to a pivot point, each lever is connected in an articulated manner to a piston rod in a wave-actuated liquid pump, that is in fluid communication with the pipe, adapted to lead the liquid to a workstation, in response to the movement of the waves, wherein the workstation comprises the assembly. The wave energy has thereby been transferred to energy in the liquid, which may be used in different processes in the assembly, such as power production or pumping of sand. The assembly is thereby powered by the energy in the liquid, which has been transferred from the waves.

By organising the array as described above, the amount of energy produced per meter of coast is considerably higher than what can be produced per meter of coast by some of the largest offshore wind turbines, known today.

For example, some of the coastlines in the world with high energy waves has a power level of about 75 Kilo Watt per continuous meter wave front. If the wave energy plant is placed along a stretch of wave front of, for example, 800 metres, this plant could theoretically have a capacity of 52 Mega Watt (MW). The largest offshore wind turbines today are 15 MW and if two are placed within an 800 metres distance, which is the distance requirement when the rotor diameter is 160 metres, then they only produce around MW all in all together. The production price pr. MW would also be lower than that of the production price of a Mega Watt from an offshore wind turbine, due to its different construction. Another advantage over for example offshore wind turbines is that the system is not very visible from the shore. Whereas off shore wind turbines can both be very noisy and also protrude far above the sea surface, and can be quite disrupting for the view, the wave energy converter and the workstation extending around the same height as a person or less above the sea-level.

The array of floating elements absorbing the wave energy from the sea is preferably closely placed in rows and columns. The floating elements are preferably designed with an optimal hydrodynamic design and will thereby be able to reduce energy loss and increase energy absorption from the passing wave fronts. The shape of the floating element may be calculated using a Navier-Stokes equation. So one may make calculations with different designs/shapes of the 2D shape (a cross section of a floating element), so the lift force on the floating element becomes the highest possible, and at the same time also design the 2D shape so that the wave loses minimal energy by passing the floating element, by it having the lowest possible drag force. This way there is more energy in the wave, when it has passed the first row of floating elements, at the time it hits the 2nd row of floating elements and so on. This highly efficient wave-energy absorption intensity of the invention gives rise to efficient wave energy area utilization not seen in other wave-energy systems.

When using the word "array", it means that the floating elements are positioned in a pattern, like rows and columns. But they could also be positioned such that every second column is shifted, or in a staggered pattern. They may be grouped together in an ordered way.

The pipe may be made of a metal alloy or it may be made of a polymer or a flexible material.

In a preferred embodiment the array comprises a series of columns of different size floating elements. Each floating element collects energy through two tiltable levers positioned on each side of the floating element. Each tiltable lever is then at the other end attached to a bearing mounted on an elongated pipe, leading to an assembly.

The wave actuated pump is connected to the pipe. A piston or pump rod is connected to the tiltable lever or rod through a bearing, so that an up and down motion of the floating element caused by wave movement, gives rise to a liquid, such as seawater, being sucked in and entering the pipe through a valve. The pipe is part of a piping system connected to a floating barge or a workstation comprising an assembly. Here the water is pumped to and into smaller hoses, whose nozzle outlets power a Pelton turbine mounted in the workstation. The Pelton turbine is connected through an axle to an electric generator that is able to produce power for an electric grid. The assembly may instead comprise a hydrogen producing vessel or a sand pump.

In an embodiment, the system is scalable, by adding or removing floating elements, levers and wave actuated pumps to the array or adding or removing an array to the pipe. Unlike most of the existing wave energy plants, the configuration of the array as described above is therefore highly scalable by simply extending or reducing the plant with several elements. The turbine and generator may be replaced to a correspondingly higher power or lower power level and/or the water-powered sand pump may be replaced for a correspondingly higher power or lower power sand pump.

The array may be easily changed from extending along a wave front of e.g. 10 meters to 2000 meters or vice versa. This gives the invention a very high energy efficiency when scaling up and down, unlike other installations where the same increased sea area is simply covered by several smaller plants, where energy efficiency is not increased accordingly.

Furthermore, the system may act as an artificially located reef on the coast, so that it protects a stretch of the coast along which it extends, from erosion.

The range of floating elements absorbing wave energy from the sea may be closely placed in the rows and columns, and with the optimal hydrodynamic design may be able to reduce energy loss and increase energy absorption from the passing wave fronts. This highly efficient wave-energy absorption intensity of the invention gives rise to efficient wave energy area utilization not seen in prior-art wave-energy plants.

Compared to offshore wind energy solutions, the energy produced according to the contemplated concept is cheaper, while the plant takes up less space in the sea pr. MW produced.

The floating elements may have a cylindrical shape. The array may comprise floating elements of different size and/or same size.

In a preferred embodiment, the system comprises a series of columns of different size floating elements.

In an embodiment, the wave actuated pump is further provided with a piston rod, the piston rod is connected to the lever, so that its oscillating movement of the floating element, caused by waves, gives rise to seawater being sucked into the pipe through a valve. The pipe is part of a piping system connected to the workstation, where the water is pumped to and into smaller hoses that power a mounted turbine, preferably floating on a barge, in a watertight barge house. The turbine may be connected through an axle to an electric generator that will be able to produce power for an electric grid or for a hydrogen development vessel. The turbine is preferably an impulse turbine, and more preferably a Pelton turbine. The Pelton turbine, since it is an impulse machine, may converge the high pressure, of the water jet with high kinetic energy to rotational energy, when the relatively thin water jets hits the impulse blades. The Pelton impulse machine may stand moving a bit, due to the waves, in the barge, when operating. Alternatively, other types of turbines may be used. In such cases, if e.g. a Francis turbine is used, it may need a steady mounting to the seabed, to be steady enough to operate, since the huge amount of water through such a turbine, due to the much lower pressure, would likely damage the machine, if it is moved at the same time.

Specifically, the levers, as a consequence of the periodic sinus-form wave movements, may respectively lift and lower the piston rod in the wave actuated pump, through a set of valves. The pump is preferably a double acting pump. The pump may pump seawater into the pipe or piping system connected to the workstation and the assembly.

In an embodiment, the assembly is a turbine, driven by the liquid, for driving a generator or a sand pump driven by the liquid or an electrolysis device for converting water to hydrogen. The turbine, which preferably is a pelton turbine, and the electric generator may be replaced by a water-pressure-driven pump that connects to a sea-bound sand suction device. The water-driven pump may connect to a sand extraction unit placed near the seabed and can thus pump sand from the seabed and onto the shore for coastal construction. The sand suction device is therefore capable of pumping sand from the seabed and onto the sandy beach for the build-up of the sandy beach.

The system differs from common beach feeding, where in calm weather, sand is pumped onto the beach from a sandpumping ship sailing along the coast. The wave energy plant according to the invention is designed to extract the energy from the incoming waves before they reach the beach, thereby preventing the otherwise naturally occurring wave erosion on the coast-caused by the normally strong wave energy on the coast. At the same time, the wave energy plant is used to pump extra sand onto the sandy beach for coastal construction.

The function of the invention as a sand pump for coastal construction may also have both visual and commercial advantages over sand pump ships. A conventional sand pump ship is on the coast and does not utilize the wave energy from the sea to pump the sand with. This means that on a given stretch of beach, a sand pumping ship must be sent out more often to pump sand onto the beaches, in order to repair the natural coastal erosion caused by the waves of a previous storm. On the contrary, the invention, by extracting the wave energy during the storm itself and using it for sand pumping, may protect the coast from the otherwise naturally occurring coastal erosion on site while simultaneously pumping sand in and building the coast up.

In an embodiment, the pipe is connected to high pressure hose outlets, preferably four outlets, where the water at jet pressure drives a turbine which, through a drive shaft, drives an electricity-producing generator that can also be connected to an electrolyzer. The electrolyzer is a unit comprising an anode and a cathode separated by an electrolyte. Electrolysis takes place in the electrolyzer, wherein electricity is used to split water into hydrogen and oxygen.

The liquid that is flowing to the assembly is preferably seawater. Alternatively, it could be a loop with fresh water or another liquid to avoid corrosion.

In an embodiment, the floating elements are hollow and fillable with a fluid, such as air or water. The array may be provided with an air pump. The air pump may be provided with a hose, extending to the sea surface, wherein an end of the hose is floating and is provided with an air intake, for providing the floating elements with air pipes, which are connected to the air pump, and which can fill the floating elements with air, runs inside the levers connected to the floating elements. When the air-pump starts to suck out air of the floating elements, low pressure will be created in the floating elements, and a valve will then open in each floating element, and seawater will run slowly in and fill the floating elements with water. In that way the array may be submerged in case a severe storm is coming, in order to avoid damage to the array. When the floating elements are already filled with seawater, air at higher pressure may be pumped into the elements through air pipes provided in the levers until air fills the element, and the array thus floats. The lever may be constructed as an air pipe, such that no separate element is needed.

When the wave energy plant is not in operational mode, e.g. during shipping to and from port or during maintenance service at sea in calm weather, the floating elements may be emptied of seawater and filled with air to ensure that the installation has minimum weight and highest buoyancy power. During normal operation, i.e, operational mode, the floating elements may be filled seawater, so that weight of the floating element and lever is in equilibrium, and floats on the surface, with an average density of the floating element and lever that is slightly lower than the seawater density. This results in the highest possible force torque on the levers in the downward wave movement.

The system may further comprise buoyancy elements, that also may be filled with a liquid such as sea water. The buoyancy elements may be fillable with a liquid as well. The buoyancy elements may be mounted on the pipe or on a support structure of the array.

As an emergency procedure for accidents, e.g, in connection with the normal operation of the plant in stormy weather at sea, in order to avoid the stranding of the plant, which may cause great destructive damage to the plant or its surroundings, the pump may fill all the floating elements and the buoyancy elements mounted on the piping system with seawater, so that the overall buoyancy of the plant is negative, causing the array to sink and settle on the seabed. Once the storm is over, the hose to sea level may allow air to enter into the floating elements and buoyancy elements, slowly rising them from the seabed to sea level.

In such a situation, the workstation, which contains the most expensive and water-sensitive electrical components (e.g. turbine and generator), may early disconnect from the wave energy converter and be closed to make it waterproof. The workstation may lower a number of anchors to the seabed, ensuring the floating of the workstation on the sea surface and its position until the storm is over. The workstation can be approached and inspected by technicians and later reconnected to the array to resume normal operation.

The system may be portable, but temporarily anchored when in an operational mode. The workstation is preferably a floating barge. The floating barge is preferably anchored to the seabed when in an operational mode. The system is preferably floating on the sea and may be anchored to the seabed through a cable.

In an embodiment, the floating elements adapted to face away from a shore are gradually larger than the floating elements adapted to face the shore.

The different 2D-shapes/profiles and lengths of the individual floating element makes it possible to optimize the extraction of wave energy in the different rows of floating elements. Since the incoming wavefront will change its form (height and length), as it progresses through each row of floating elements towards the shore, the wave shape and length will have its highest length and height passing through the 1st row of floating elements. Then the wave energy absorbed in the 1st row will cause a reduction in wave height, as it hits the 2nd row of floating elements. Ideally one then has an array/column, that has so many floating elements, being smaller and smaller as the wave front moves towards the shore and the pipe, so the wave will have no height and no length, where after all wave energy coming in with the original wave has been absorbed by the array.

The system may be provided with a sand suction assembly, when used for pumping sand.

In an embodiment, in the operational mode the floating elements are filled with sea water, to an extent that the floating element and the lever is in equilibrium and float on the surface, where the density of the floating element and the lever is a little less than the density of the sea water. This configuration may secure highest possible moment of force on the levers and/or piston rod in both directions.

In an embodiment, at least one of the floating elements, the levers, the piston rods and the pumps are sized such that the liquid is pumped under high pressure, such has around 100-200 bars, preferably around 200 bars. The pump is preferably relatively small and together with the piston rod which is relatively long, high pressures may be obtained.

In an embodiment the system further comprises a sand extraction unit adapted to be positioned below the sea level, connected to the sand pump. The sand extraction unit is adapted to pump up sand within a circle. The sand extraction unit may comprise a bottom tube adapted to extend along the seabed. The bottom tube may be provided with a wheel at the end to allow gathering of the sand within a circle, where the wheel is adapted to drive along the edge of the circle. The sand is preferably pump up through a tube in a centre of the circle connected to the bottom tube.

The wave actuated pump may comprise metal, preferably a corrosion resistant alloy, such as stainless steel or marine grade alloys, such as grade 316 stainless steel, containing 18% chromium, but having more nickel than 304 and 2-3% molybdenum.

In another embodiment, the workstation is provided with a counterweight to balance the workstation on the sea surface. The workstation is preferably sized such that a person may enter it and is able to perform maintenance on the assembly in the workstation.

Different features from different embodiments may be combined freely.

The words plant and system are used interchangeably.

DETAILED DESCRIPTION

The invention will now be described in more detail below and with several examples of design and with detailed reference to the schematic drawings in which FIG. 1 shows a top view of an embodiment of a system in a 3-dimensional X,Y,Z coordinate system on a scale of 1:100. The system comprises an array of floating elements, which during operation will be floating at sea level.

FIG. 4 shows a view in the X,Y-plane of an embodiment of a workstation on a scale of 1:20, in the form of a floating barge and its content when the invention is set up for electricity or hydrogen production.

FIG. 5 shows a view in the Y,Z-plane of an embodiment of the workstation in FIG. 4 when producing electricity.

FIG. 6 is a side view in the X,Z-plane of an embodiment of the workstation on a scale of 1:20 as shown in FIG. 4 and FIG. 5 when the invention produces electricity.

FIG. 7 shows a view in the X,Y-plane of an embodiment of a workstation on a scale of 1:20 when the system pumps sand up from the seabed.

FIG. 8 shows a view in the Y,Z-plane of an embodiment of the workstation as seen in FIG. 7, when the system pumps sand up from the seabed.

The indicated scales on the figures are just examples of scales. The system may be made in different scales or in different ratio of sizes between the individual elements.

When the reference number is followed by an "i" or "ii" it is merely different instances of the same element.

Figure 9:
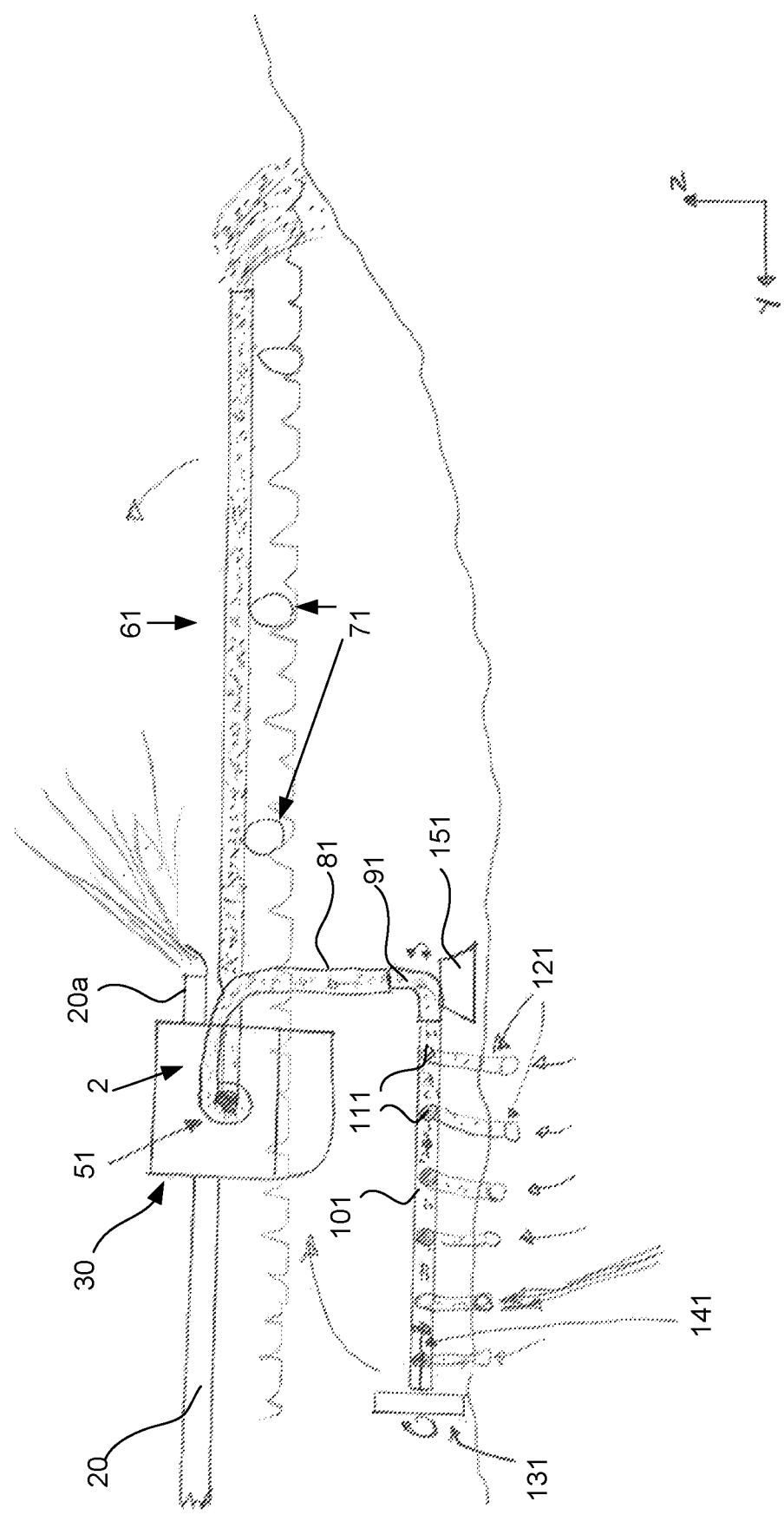
FIG. 9 shows a perspective view in the Y, Z-plane of an embodiment of the workstation shown in FIG. 7 and FIG. 8, when the invention pumps sand up from the seabed, as well as an overview of the pump and piping system leading to the seabed.
Figure 10:
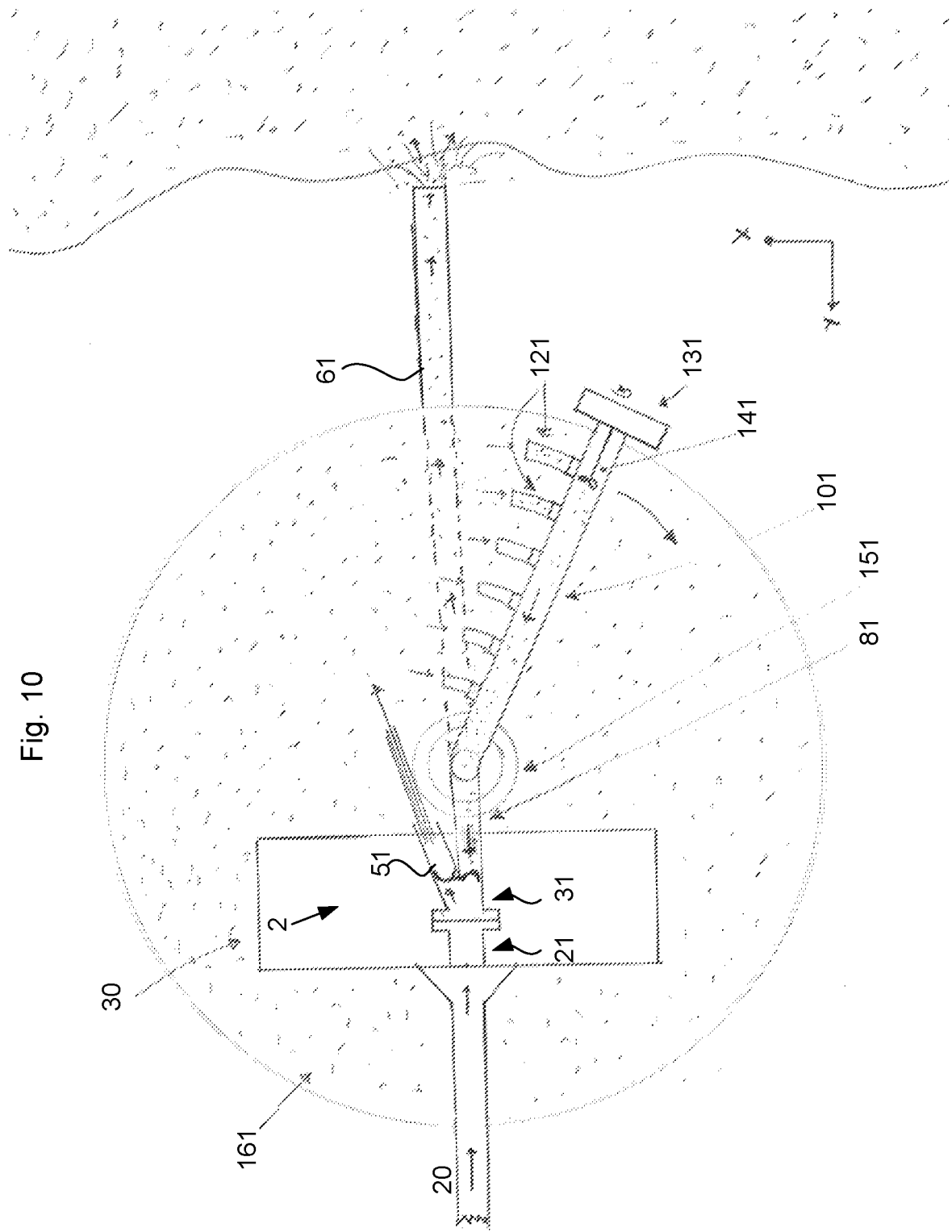
FIG. 10 is a top view in the X, Z-plane of an embodiment of the system that pumps sand up from the seabed.

The wave-energy plant or system (shown in FIG. 1) can function eiCher as an electricity and/or hydrogen producing unit (FIG. 4, FIG. 5 and FIG. 6), or a unit that pumps sand up from the seabed and convey it onto the shore (FIG. 9 and FIG. 10).

Figure 1:
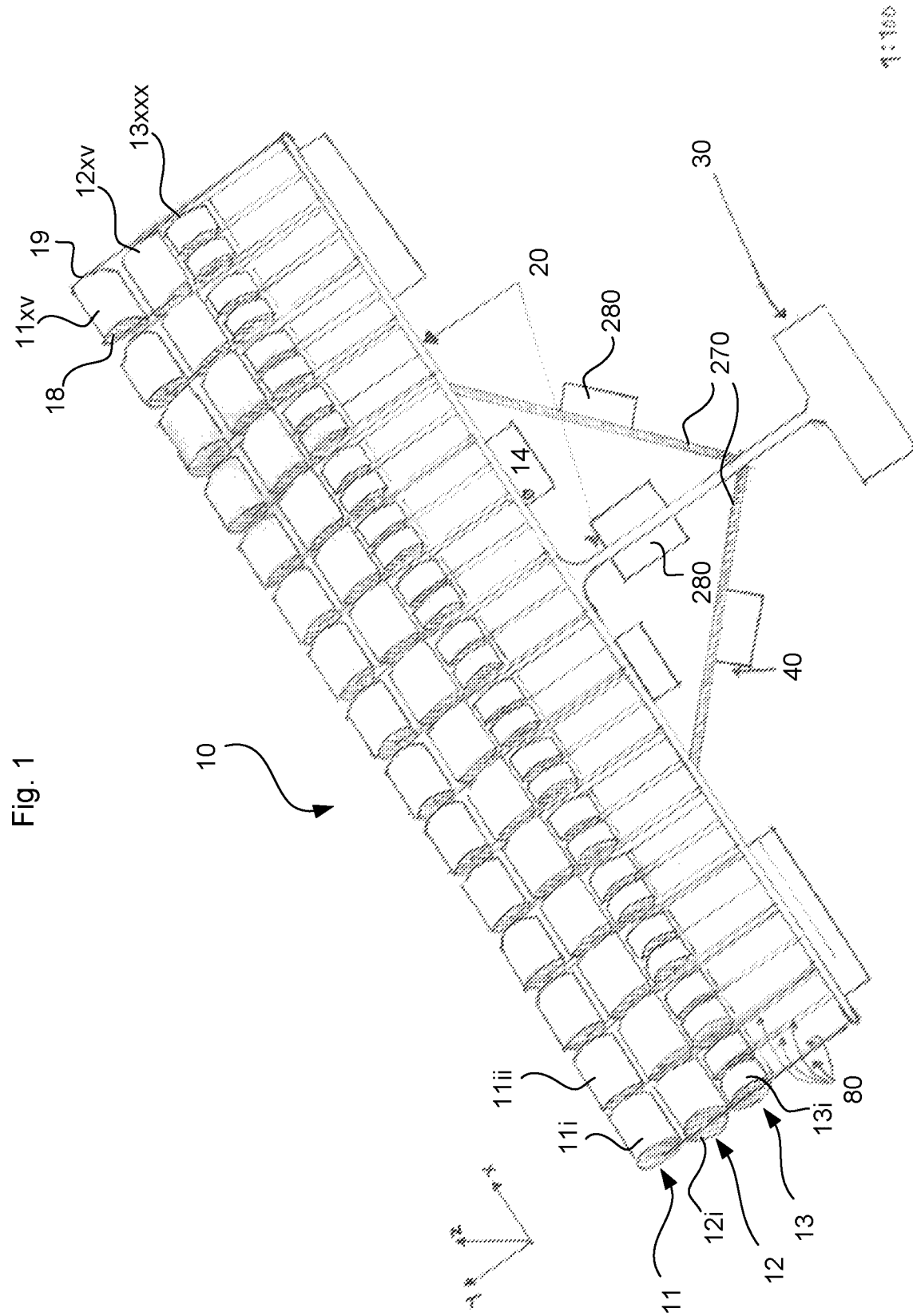

FIG. 1 shows an embodiment of a wave energy converter 1 comprising an array 10 of floating elements 11*i*-11*xv*, 12*i*-12*xv*, 13*i*-13*xxx*, in normal operation. I.e. the floating elements 11*i*-11*xv*, 12*i*-12*xv*, 13*i*-13*xxx* are floating on the sea surface. The array 10 comprises a number of columns 11*i*-11*xv*, 12*i*-12*xv* of floating elements and a number of rows, 11, 12, 13. In the embodiment in FIG. 1 there are three rows, 11, 12, 13 and fifteen columns 11*i*-11*xv* and 12*i*-12*xv*, where row 11 and 12 consist of a single number of floating elements and row 13 consists of two floating elements in each column, 13*i*-13*xxx*. The number of rows and columns could be different depending on the size of waves in the area the system is to be located. Each floating element has a first 18 and a second 19 end. FIG. 1 also shows an electrically powered air pump 14, powered by a set of batteries charged by the generator 150 (shown in FIG. 4). The air pump 14 is connected to a hose (not shown) with an air intake that always floats at sea level, even when the system is submerged. The hose runs parallel to a wire from an electric pump (not shown) to the sea level. The wire acts as an additional backup system for pumping air into the floating elements from the surface when the system is submerged, or it supplies the electrically powered air pump 14 with electricity if the battery is drained. In FIG. 1, supporting beams 270 are supporting the piping system. They are solid and made of metal, preferably a marine grade alloy. At each end 18, 19 of the floating elements, a lever 80 is connecting the floating elements 11*i*-11*xv*, 12*i*-12*xv*, 13*i*-13*xxx* to a pipe system 20. The lever 80 is hollow and maybe used for conveying either liquid, such as water or air, to the floating elements 11*i*-11*xv*, 12*i*-12*xv*, 13*i*-13*xxx*, in order to regulate their buoyancy, or submerge or lift them from the sea bottom. The pipe 20 is connected to a workstation 30 positioned on a floating barge. The workstation 30 houses an assembly 2, which could be a turbine connected to a generator for generating power or a sand pump or a vessel for producing hydrogen. The workstation 30 may be changed to a different workstation comprising a different assembly, depending on the desired outcome, such as power, hydrogen or pumping sand.

The buoyancy elements 280, that may be used to lift or submerge the array 10, are mounted on the supporting beams 270.

Wave-actuated pumps (not shown in FIG. 1) are mounted on the pipe 20 and are positioned under the floating elements, and therefore not visible on FIG. 1.

Figure 2:
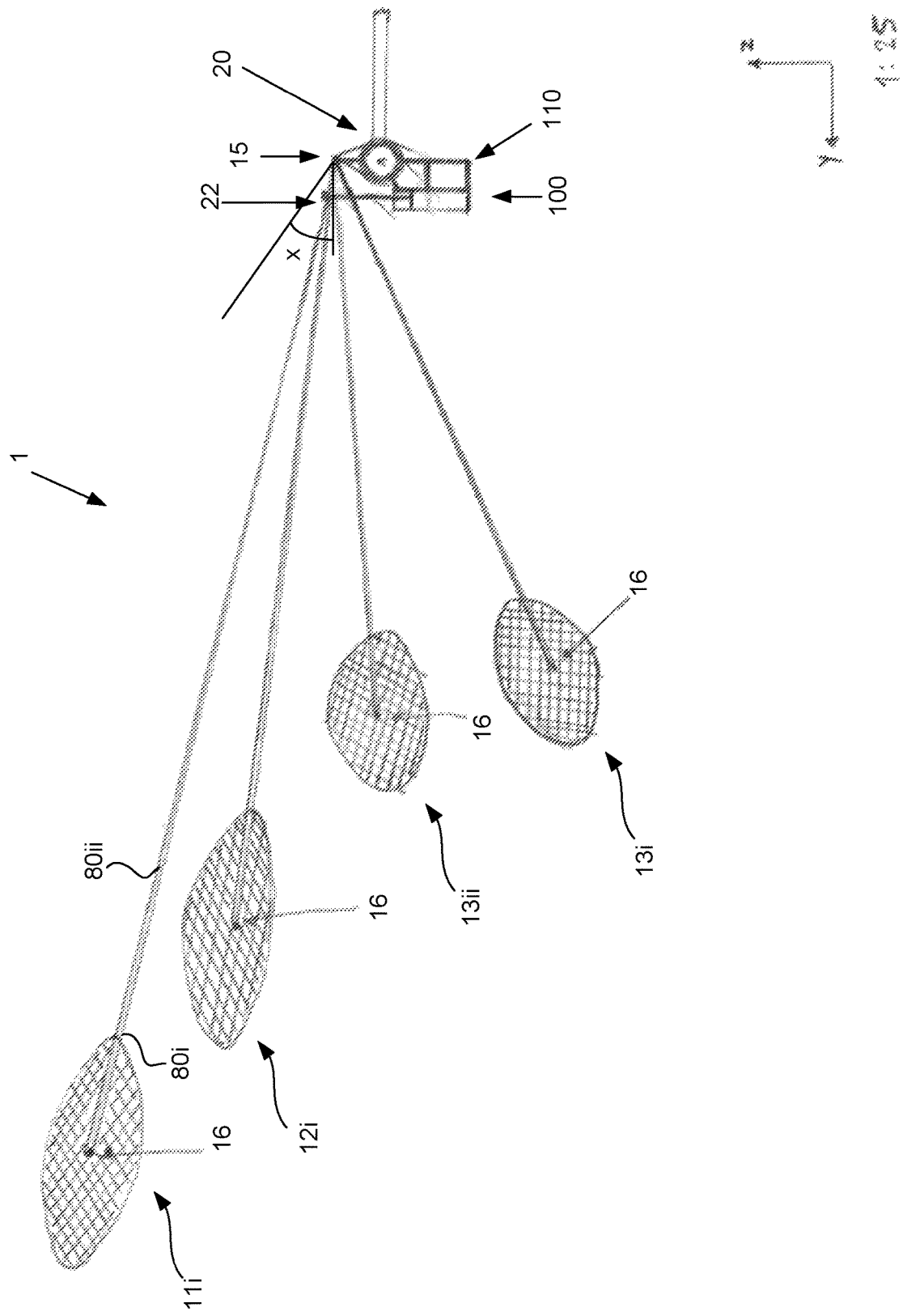
FIG. 2 shows a side view in the Y, Z-plane of an embodiment of a wave energy converter on a scale of 1:25. The wave energy converter comprises a column of floating elements and associated levers, connected to a pump's piston rod, which is in communication with a piping system.

FIG. 2 is a view of an embodiment of a wave energy converter 1 where the pipe 20 leads to the assembly (not shown). The wave energy converter 1 comprises columns of floating elements 11*i*, 12*i*, 13*i*, 13*ii* that at their ends are connected to a bearing 16 which are connected to two tilting levers 80*i*, 80*ii*. Instead of columns it could be complete arrays connected in this way. More tilting levers may be present than shown on the figure. The tilting levers 80*i*, are connected to a bearing 15 anchored in 3 rods 91, 92, 93 (see FIG. 3) mounted on the pipe 20. Each tilting lever 80 is connected to a hinge 22 that connects to a pump 100 comprising a piston rod 93*i* which at the lower end is provided with a piston 131 mounted in the pump housing 103*i* (see FIG. 3) connected to the pipe 20. A manifold 110 is further connected to the pump 100.

Figure 3:
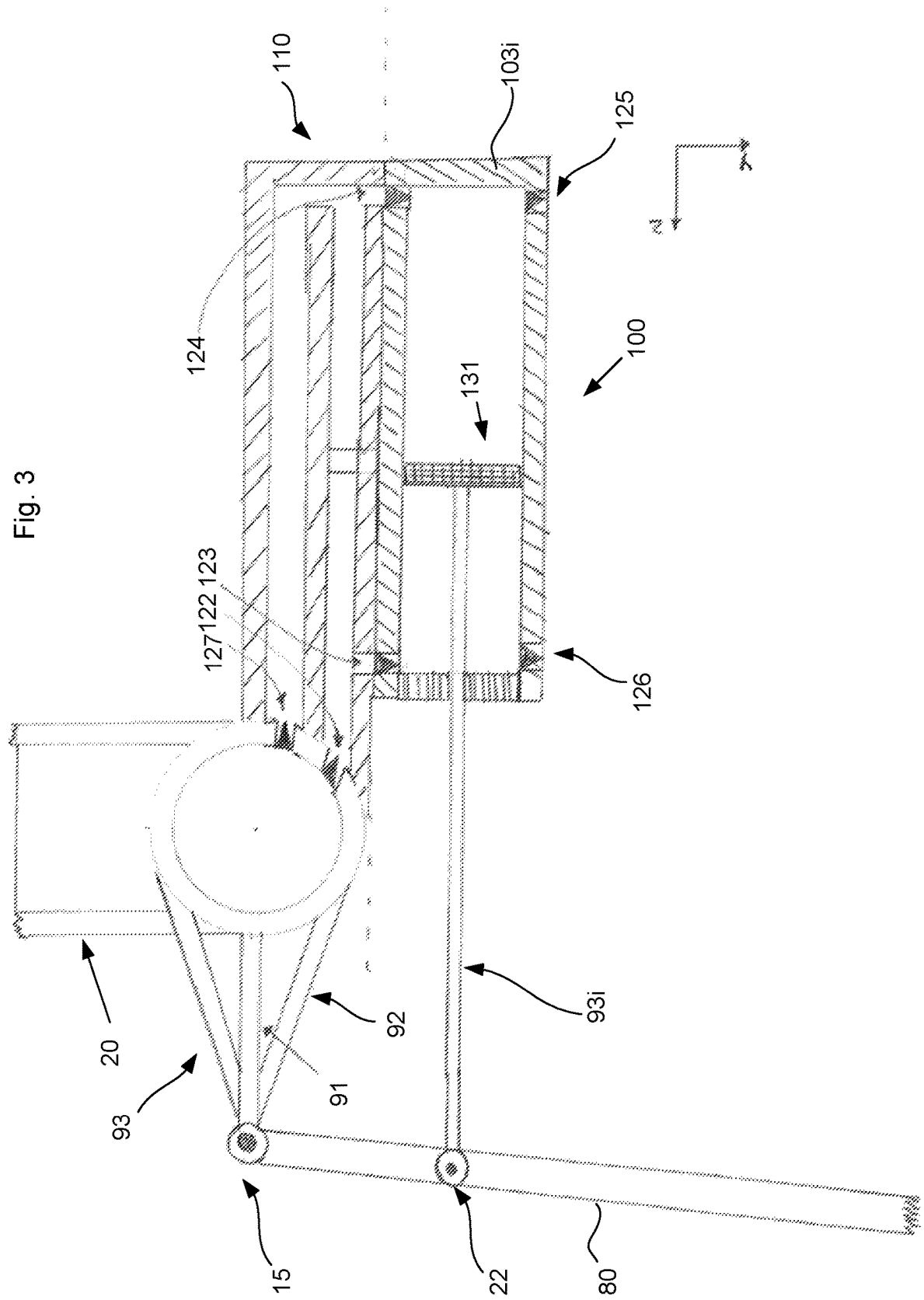
FIG. 3 shows a cross sectional view in the Z,Y-plane of an embodiment of the workstation as shown in FIG. 2.

FIG. 3 shows a more detailed view of the pump 100 and the associated elements. When incoming wave fronts pass the floating elements, they will first provide an upward movement for each of the floating elements, which results in an upward movement of tilting lever 80. This results in the piston rod 93*i* being raised in the pump housing 103*i* so that the bottom valve 125 of the pump housing sucks water into the pump housing 103*i*, in the chamber under the piston 131. Above the piston 131, water is pushed out of the upper pump chamber through the valve 123 to the manifold 110, and on through a valve 122 into pipe 20. When the wave front has passed the array of floating elements, the floating elements will be lowered on the sea surface, resulting in tilting lever 80 being lowered and piston rod 93*i* and piston 131 sucking in water through the valve 126 into the upper pump chamber above the piston, while simultaneously pushing water out of the lower pump chamber, under the piston, through valve 124 to the manifold 110 and on through valve 127 into the pipe 20. Floating elements, tilting levers, bearings, piston rods, pistons, pump housing and pipes are all dimensioned such that the water is pumped under high pressure (e.g. 200 Bars). Thereby the amount of material used for manufacturing of the system is reduced and effective utilization of the wave energy is obtained.

The water in the pipe 20 can then be pumped further into the piping system for distribution in the assembly positioned in the workstation 30 (shown in FIG. 4) on the floating barge. The assembly can either function as a power or hydrogen generation unit or sand pumping unit.

In FIG. 4 the workstation 30 is seen in the X,Y-plane, and in FIG. 5 in the Y,Z-plane. The water is conveyed under high pressure in pipe 20 through a wall plate 170, to a high-pressure hose outlet 180. Along the center-axis of the pipe 20, a Pelton turbine is mounted on a foot 240 (see FIGS. 5 and 6) on the floor 220 of the barge. High-pressure hoses 200 are mounted to the high-pressure hose outlets 180. The outlet ends of the high-pressure hoses 200 are provided with high-pressure nozzles 210, which are mounted at the top, bottom and at the back of the drive wheel 140, so that the nozzles 210 send high-pressure water perpendicularly towards the Pelton turbine's impulse blades, mounted around the outer rim of a drive wheel 140. The drive wheel 140 is mounted on a bearing-mounted drive shaft 160 connected to an electric generator 150. In the workstation 30, opposite the drive shaft 160, generator and Pelton turbine, a counterweight 190 is mounted on the floor (see FIG. 4 & FIG. 6). The counterweight 190 balances these units around the Y axis or the center axis of the pipe 20, such that the workstation 30 is positioned substantially horizontally on the sea surface.

In FIG. 6, the drive shaft 160 passes through two waterproof walls 251 and 252 to make the room containing the generator 150 waterproof, for protection of the generator's electrical components. The workstation 30 is designed so that it is just as waterproof as a lifeboat, as it for a long period of time must be able to remain undamaged when it is anchored at sea and when e.g, the piping system and array are disconnected and located on the seabed during a storm. The floor 220 is adapted to extend in the X plane just above the sea level in calm weather conditions. The counterweight 190 is provided with feet 260, attached to the floor of the workstation 30 and the generator 150 is provided with feet 16a as well, attached to the floor of the workstation 30.

Figure 8A:
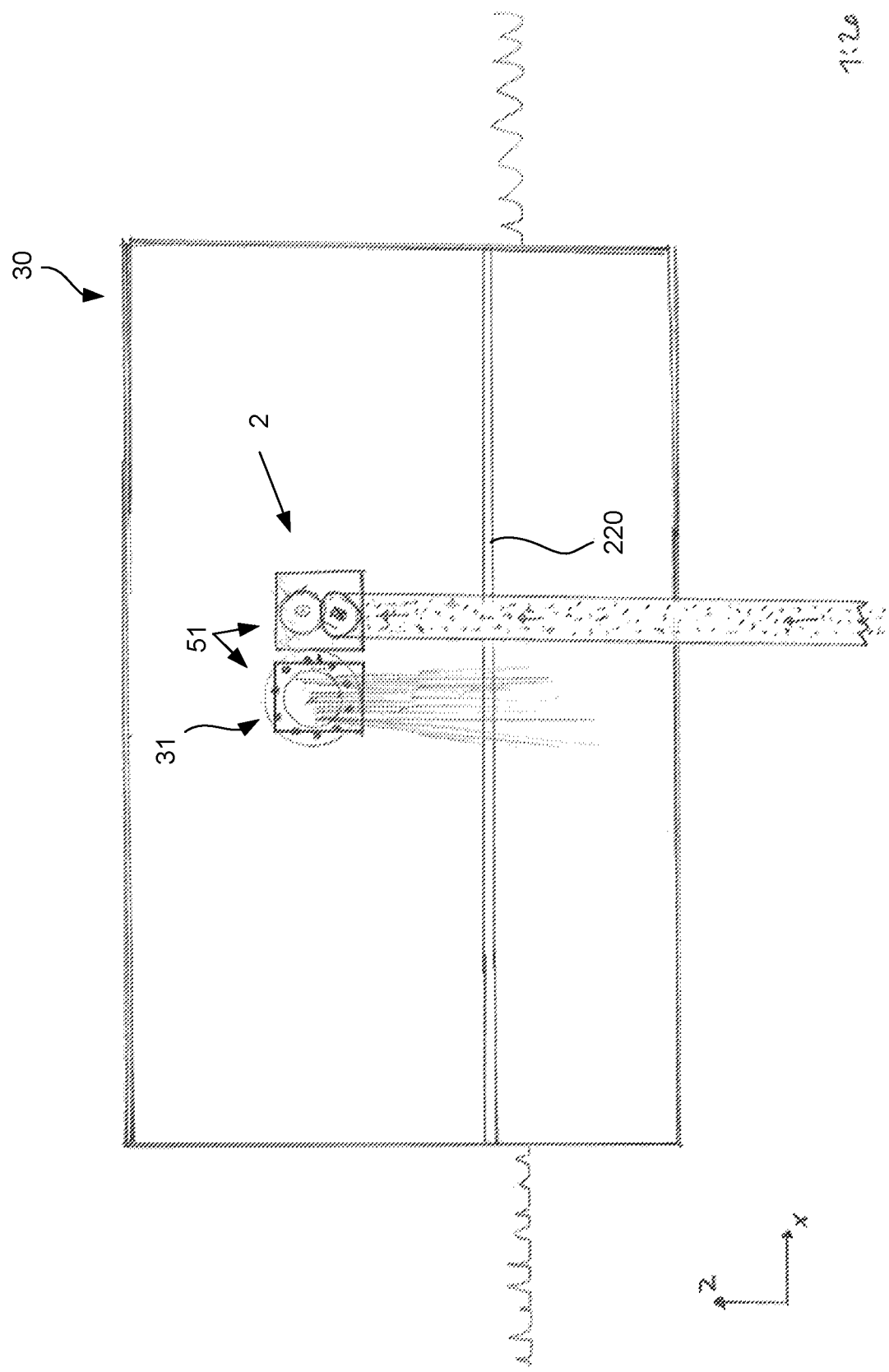
FIG. 8A shows a view in the X, Z plane of an embodiment of the workstation as seen in FIGS. 7 and 8, when the system pumps sand up from the seabed.

FIG. 7 shows workstation 30 in the X,Y-plane. FIG. 8 shows the workstation in the Y,Z-plane, while FIG. 8a shows the workstation in the X,Y-plane. In FIGS. 7-8a, the plant is set up for sand pumping. In continuation of the pipe 20, a connector 21 with a flange is mounted, on which a pipe connecting piece 31 with a flange is fitted with bolts 41. It may be fitted by other means. A sand pump 51 is mounted on the pipe connecting piece 31.

FIG. 9 shows the workstation 30 in the Y, Z-plane while FIG. 10 shows the workstation 30 in the X,Y-plane. As the sand pump 51 operates the water used for pumping the sand is discharged from the pipe outlet 20a. The pipe outlet 20a is positioned at sea level. At the same time, the sand pump 51 pumps sand up through the suction unit's suction tube(s) 81 which form a substantially 90 degree angle. The suction tube 81 comprises an angular tube 91 connected to a bottom tube 101, extending across and close to the seabed. The bottom tube 101 is at intervals fitted with a number of holes 111 in which hoses 121 are fitted and dragged around in a circular motion on top of the sand of the seabed, thus pumping up the sand. At the end of the bottom tube 101, a wheel 131 is fitted. The wheel 131 rotates slowly around the seabed in a circular orbit having a radius equal to the bottom tube's 101 length and a centre where the angular tube 91 is mounted on a plinth 151 (also seen in FIG. 10). The plinth 151 together with the wheel 131 ensure that the bottom tube 101 is held substantially horizontally and at a given distance above the seabed. The wheel 131 is driven by a small cogwheel and a propeller 141 mounted in the bottom tube 101 and is driven by the water flow. In FIG. 9 it is shown that the outlet tube 61 connected with the sand pump 51, is supported by pontons 71. This allows sand being pumped through the outlet tube 61 to be discharged onto the surface of a shoreline on the coast. So, within a circular area, sand is collected by the system and pumped into the tube 61 which is positioned above the sea level.

In FIG. 10, an overview of the piping system including tube 61 is presented, which within a circular area collects sand through the hoses 121 from the seabed and pumps it into the piping system positioned above the sea level and subsequently deposits the sand onto the shore. Several hoses 121 are positioned next to each other on the bottom tube 101 through holes 111. The system can thus collect sand by "vacuuming" areas of the seabed in an efficient and quick manner.

The invention should not be limited to the embodiments illustrated and described, but also include similar embodiments, which would be apparent for a person skilled in the art and which fall within the scope defined by the claims.

The invention claimed is:

1. A system comprising:
   a wave energy converter; and
   a workstation, the workstation comprising an assembly, the assembly adapted to be driven by the wave energy converter, the wave energy converter comprises an array, in the form of rows and columns of floating elements adapted to float on an aquatic surface in a vicinity of a shore, each floating element having a first end and a second end, each end being connected to a lever, the lever being connected through a bearing to a pivot point, each lever is connected in an articulated manner to a piston rod in a wave-actuated liquid pump that is in fluid communication with a pipe, the pipe is adapted to transmit a liquid to the workstation,
   wherein the assembly is a Pelton turbine, driven by the liquid, wherein the Pelton turbine is configured to drive a generator, a sand pump or an electrolysis device, wherein the electrolysis device is configured to convert water into hydrogen.

2. The system according to claim 1, wherein the system is scalable, by adding floating elements, levers and wave actuated pumps to the array, or by adding the array to the pipe.

3. The system according to claim 1, wherein the floating elements are hollow and are configured to be filled with a fluid.

4. The system according to claim 1, wherein the array comprises an air pump, provided with a hose, extending to the aquatic surface, wherein an end of the hose is configured to float and is provided with an air intake, wherein the air pump is configured to provide air to the floating elements.

5. The system according to claim 1, wherein the system is configured to be temporarily anchored when in an operational mode.

6. The system according to claim 1, wherein the floating elements comprise floating elements adapted to face away from the shore and floating elements adapted to face the shore, wherein the floating elements adapted to face away from the shore are larger than the floating elements adapted to face the shore.

7. The system according to claim 1, wherein the system comprises a sand suction assembly.

8. The system according to claim 1, wherein in an operational mode the floating elements are filled with water, to an extent that each floating element and the lever is in equilibrium and float on the aquatic surface, where a density of each floating element and the lever is lower than and close to the density of the water, on which they float.

9. The system according to claim 1, wherein at least one of the floating elements, the lever, the piston rod, the pump are sized such that the liquid is configured to be pumped under high pressure, in a range of 100-200 bars.

10. The system according to claim 1, wherein the workstation is provided with a counterweight to balance the workstation on the aquatic surface.

11. The system according to claim 2, wherein the system further comprises a sand extraction unit adapted to be positioned below a level of the aquatic surface, connected to the sand pump.

12. A system comprising:
   a wave energy converter; and a workstation, the workstation comprising an assembly, the assembly adapted to be driven by the wave energy converter, the wave energy converter comprises an array, in the form of rows and columns of floating elements adapted to float on an aquatic surface in a vicinity of a shore, each floating element having a first end and a second end, each end being connected to a lever, the lever being connected through a bearing to a pivot point, each lever is connected in an articulated manner to a piston rod in a wave-actuated liquid pump that is in fluid communication with a pipe, the pipe is adapted to transmit a liquid to the workstation, wherein the assembly is a Pelton turbine, driven by the liquid, wherein the Pelton turbine is configured to drive a generator, a sand pump or an electrolysis device, wherein the electrolysis device is configured to convert water into hydrogen, and wherein the system is configured to be temporarily anchored when in an operational mode.

13. The system according to claim 12, wherein the system is scalable, by adding floating elements, levers and wave actuated pumps to the array, or by adding the array to the pipe.

14. The system according to claim 12, wherein the array comprises an air pump, provided with a hose, extending to the aquatic surface, wherein an end of the hose is configured to float and is provided with an air intake, wherein the air pump is configured to provide air to the floating elements.

15. The system according to claim 12, wherein the system comprises a sand suction assembly.

16. The system according to claim 12, wherein at least one of the floating elements, the lever, the piston rod, the pump are sized such that the liquid is configured to be pumped under high pressure, in a range of 100-200 bars.

17. A system comprising:
a wave energy converter; and
a workstation, the workstation comprising an assembly and a counterweight, the assembly adapted to be driven by the wave energy converter, the wave energy converter comprises an array, in the form of rows and columns of floating elements adapted to float on an aquatic surface in a vicinity of a shore, each floating element having a first end and a second end, each end being connected to a lever, the lever being connected through a bearing to a pivot point, each lever is connected in an articulated manner to a piston rod in a wave-actuated liquid pump that is in fluid communication with a pipe, the pipe is adapted to transmit a liquid to the workstation, wherein the counterweight is configured to balance the workstation on the aquatic surface, wherein the assembly is a Pelton turbine, driven by the liquid, wherein the Pelton turbine is configured to drive a generator, a sand pump or an electrolysis device, wherein the electrolysis device is configured to convert water into hydrogen.

18. The system according to claim 17, wherein the system is scalable, by adding floating elements, levers and wave actuated pumps to the array, or by adding the array to the pipe.

19. The system according to claim 17, wherein the array comprises an air pump, provided with a hose, extending to the aquatic surface, wherein an end of the hose is configured to float and is provided with an air intake, wherein the air pump is configured to provide air to the floating elements.

20. The system according to claim 17, wherein the system comprises a sand suction assembly.

21. The system according to claim 17, wherein at least one of the floating elements, the lever, the piston rod, the pump are sized such that the liquid is configured to be pumped under high pressure, in a range of 100-200 bars.

* * * * *